(12) United States Patent
Huang et al.

(10) Patent No.: US 11,654,584 B2
(45) Date of Patent: May 23, 2023

(54) ACTUATOR

(71) Applicant: INDUSTRIAL TECHNOLOGY RESEARCH INSTITUTE, Hsinchu (TW)

(72) Inventors: Cheng-Kai Huang, Taichung (TW); Zhi-Xiang Chen, Taichung (TW); Chi-Ying Lin, Taipei (TW); Chien-Ping Wu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 153 days.

(21) Appl. No.: 17/402,104

(22) Filed: Aug. 13, 2021

(65) Prior Publication Data
US 2022/0402149 A1 Dec. 22, 2022

(30) Foreign Application Priority Data
Jun. 18, 2021 (TW) ................................ 110122453

(51) Int. Cl.
*B25J 19/06* (2006.01)
*F16D 3/56* (2006.01)
(Continued)

(52) U.S. Cl.
CPC ......... *B25J 19/068* (2013.01); *B25J 17/0241* (2013.01); *F16D 3/56* (2013.01); *F16D 3/62* (2013.01); *F16D 3/66* (2013.01)

(58) Field of Classification Search
CPC ... F16D 3/62; F16D 3/56; B25J 9/1045; B25J 19/068
See application file for complete search history.

(56) References Cited

U.S. PATENT DOCUMENTS

| 5,327,790 A * | 7/1994 | Levin ........................ B25J 9/12 73/862.321 |
| 8,827,345 B2 | 9/2014 | Vanmiddendorp et al. |

(Continued)

FOREIGN PATENT DOCUMENTS

| CA | 2910565 C | 10/2014 |
| CA | 3020920 A1 | 10/2017 |

(Continued)

OTHER PUBLICATIONS

Jafari et al., "AwAS-II: A new Actuator with Adjustable Stiffness based on the novel principle of adaptable pivot point and variable lever ratio", 2011 IEEE International Conference on Robotics and Automation, May 9, 2011.

(Continued)

*Primary Examiner* — Abiy Teka
(74) *Attorney, Agent, or Firm* — Maschoff Brennan

(57) ABSTRACT

An actuator includes a casing, an output disc, a transmission component, a cable, a power source, and a tension adjustment assembly. The output disc and the transmission component are rotatably disposed on the casing. The cable is disposed through the transmission component and connected to the output disc. The power source can drive the transmission component. The tension adjustment assembly includes a lever, an elastic component, and a slidable component. The lever has a first end and a second end opposite to each other. The first end is connected to the cable. The elastic component is connected to the casing and the second end of the lever. The slidable component is in contact with a portion of the lever located between the first end and the second end, and is slidable along the lever to change its position to adjust a tension of the cable.

10 Claims, 9 Drawing Sheets

(51) Int. Cl.
  *F16D 3/66* (2006.01)
  *F16D 3/62* (2006.01)
  *B25J 17/02* (2006.01)

(56) References Cited

U.S. PATENT DOCUMENTS

| | | | |
|---|---|---|---|
| 8,991,169 | B2 | 3/2015 | Zoppi |
| 9,045,193 | B2 | 6/2015 | Dal Pra' |
| 9,157,485 | B2 | 10/2015 | Pane et al. |
| 9,840,012 | B2 | 12/2017 | Schimmels et al. |
| 10,040,206 | B2 | 8/2018 | Jeong et al. |
| 10,634,125 | B2 | 4/2020 | Morishima |
| 2004/0169112 | A1* | 9/2004 | Grossart ............ G09B 9/28 244/233 |
| 2016/0136031 | A1* | 5/2016 | Cestari Soto ......... B25J 17/00 74/89.23 |
| 2017/0321666 | A1 | 11/2017 | Morishima |
| 2018/0116851 | A1* | 5/2018 | Lee ................ A61F 5/0102 |
| 2018/0263468 | A1 | 9/2018 | Morishima |
| 2018/0266402 | A1 | 9/2018 | Takahashi |
| 2019/0046008 | A1 | 2/2019 | Morishima |
| 2019/0061153 | A1 | 2/2019 | Gregg et al. |
| 2019/0126498 | A1 | 5/2019 | Schimmels et al. |
| 2019/0248031 | A1 | 8/2019 | Takahashi |
| 2019/0299425 | A1 | 10/2019 | Ishikawa |
| 2020/0046204 | A1 | 2/2020 | Morishima |
| 2020/0078599 | A1* | 3/2020 | Chen ................ A61N 2/006 |
| 2020/0121478 | A1* | 4/2020 | Woge ............... B25J 13/085 |
| 2020/0139538 | A1 | 5/2020 | Jafari |
| 2020/0147813 | A1 | 5/2020 | Esfahani |
| 2020/0254634 | A1 | 8/2020 | Awad et al. |
| 2020/0352811 | A1 | 11/2020 | Varghese et al. |
| 2020/0368919 | A1 | 11/2020 | Stoelen |

FOREIGN PATENT DOCUMENTS

| | | |
|---|---|---|
| CN | 204095581 U | 1/2015 |
| CN | 106426149 A | 2/2017 |
| CN | 105264255 B | 5/2018 |
| CN | 108135437 A | 6/2018 |
| CN | 108457056 A | 8/2018 |
| CN | 109068939 A | 12/2018 |
| CN | 209217831 U | 8/2019 |
| CN | 110315519 A | 10/2019 |
| CN | 110520030 A | 11/2019 |
| CN | 107205617 B | 3/2020 |
| CN | 109476023 B | 4/2020 |
| CN | 110978045 A | 4/2020 |
| CN | 106863348 B | 5/2020 |
| CN | 111093909 A | 5/2020 |
| DE | 112015006095 T5 | 10/2017 |
| DE | 112016006759 T5 | 12/2018 |
| EP | 2619469 B1 | 7/2013 |
| EP | 2989345 B1 | 3/2016 |
| EP | 3378373 A4 | 9/2018 |
| EP | 3442756 A4 | 2/2019 |
| IT | 1402194 B1 | 3/2012 |
| IT | GE20110096 A1 | 2/2013 |
| JP | WO2016189683 A2 | 12/2016 |
| JP | 6421202 B2 | 10/2018 |
| JP | 2019513568 A | 5/2019 |
| JP | 6556697 B2 | 7/2019 |
| JP | 6568951 B2 | 8/2019 |
| JP | 6574852 B2 | 8/2019 |
| JP | 6608045 B2 | 11/2019 |
| JP | 6655733 B2 | 2/2020 |
| KR | 101684761 B1 | 12/2016 |
| TW | 200722335 A | 6/2007 |
| TW | 200911612 A | 3/2009 |
| TW | I495460 B | 8/2015 |
| TW | I592588 B | 7/2017 |
| WO | 2012038931 A1 | 3/2012 |
| WO | 2014176423 A1 | 10/2014 |
| WO | 2016111436 A1 | 7/2016 |
| WO | 2016121060 A1 | 8/2016 |
| WO | 2016189683 A1 | 12/2016 |
| WO | 2017085880 A1 | 5/2017 |
| WO | 2017094085 A1 | 6/2017 |
| WO | 2017180968 A1 | 10/2017 |
| WO | 2017183078 A1 | 10/2017 |
| WO | 2018083763 A1 | 5/2018 |
| WO | 2018193541 A1 | 10/2018 |
| WO | 2018223148 A2 | 12/2018 |
| WO | 2019043545 A1 | 3/2019 |

OTHER PUBLICATIONS

Bacek et al., "Conceptual design of a novel variable stiffness actuator for use in lower limb exoskeletons" IEEE International Conference on Rehabilitation Robotics, Aug. 11, 2015.

Mathijssen et al., "Cylindrical cam mechanism for unlimited subsequent spring recruitment in Series-Parallel Elastic Actuators" IEEE International Conference on Robotics and Automation, May 26, 2015.

Tonietti et al., "Design and Control of a Variable Stiffness Actuator for Safe and Fast Physical Human/Robot Interaction" IEEE International Conference on Robotics and Automation, Apr. 2005.

Dezman, Miha and Andrej Gams, "Pseudo-linear variable lever variable stiffness actuator: Design and evaluation", IEEE International Conference on Advanced Intelligent Mechatronics (AIM), Jul. 3, 2017.

Fumagalli et al., "The mVSA-UT: A miniaturized differential mechanism for a continuous rotational variable stiffness actuator" IEEE RAS/EMBS International Conference on Biomedical Robotics and Biomechatronics, Jun. 24, 2012.

Taiwanese Office Action from corresponding TW Application No. 110122453, dated Mar. 2, 2022.

* cited by examiner

ACTUATOR

CROSS-REFERENCE TO RELATED APPLICATIONS

This non-provisional application claims priority under 35 U.S.C. § 119(a) on Patent Application No(s). 110122453 filed in Taiwan, R.O.C. on Jun. 18, 2021, the entire contents of which are hereby incorporated by reference.

TECHNICAL FIELD

The disclosure provides an actuator, more particularly to an actuator capable of adjusting the stiffness thereof.

BACKGROUND

A typical robot arm includes multiple arms with an actuator connected therebetween, the actuator has a motor therein to drive one arm to move relative to another. In this case, the arm directly driven by the motor will have a great stiffness relative to the other arm it moves. Thus, if an unwanted object hits or exists in the path of the arm directly driven by the motor will likely cause damage to both of them, resulting in safety concerns.

To avoid the above situation, some actuators limit the stiffness between the motor and the arm so as to make the arm being directly driven by the motor more elastically reacting to the involved object. This solution reduces stiffness, but it may make the arm unable to provide a sufficient torsion to meet the demands.

SUMMARY

The disclosure provides an actuator capable of adjusting the stiffness thereof.

One embodiment of the disclosure provides an actuator. The actuator includes a casing, an output disc, a transmission component, a cable, a first power source, and a tension adjustment assembly. The output disc is rotatably disposed on the casing. The transmission component is rotatably disposed on the casing. The cable is disposed through the transmission component and has an end connected to the output disc. The first power source is disposed on the casing and connected to the transmission component. The first power source is configured to drive the transmission component to rotate relative to the casing. The tension adjustment assembly includes a lever, an elastic component, and a slidable component. The lever has a first end and a second end opposite to each other. The first end is connected to another end of the cable. The elastic component is connected to the casing and the second end of the lever. The slidable component is slidably disposed on the casing and in contact with a portion of the lever located between the first end and the second end of the lever. The slidable component is slidable along the lever to change a position thereof relative to the first end and the second end so as to adjust a tension of the cable.

According to the actuator as discussed in the above embodiment, the tension of the cable can be adjusted by adjusting the ratio of the effort arm of the cable to the resistance arm of the elastic component, such that the stiffness of the output disc relative to the transmission component is able to be adjusted to respond to various operating conditions.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
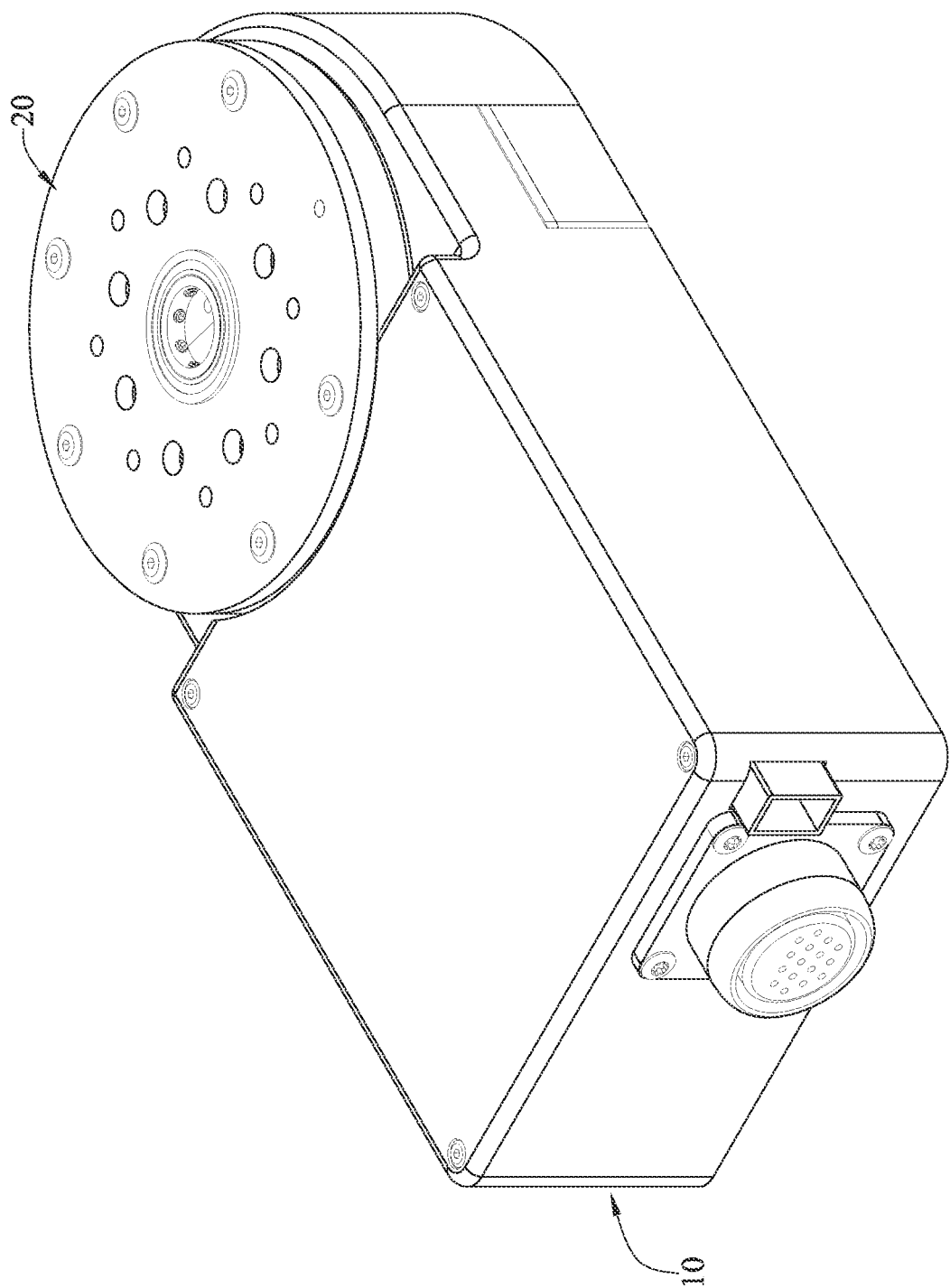
FIG. 1 is a perspective view of an actuator according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
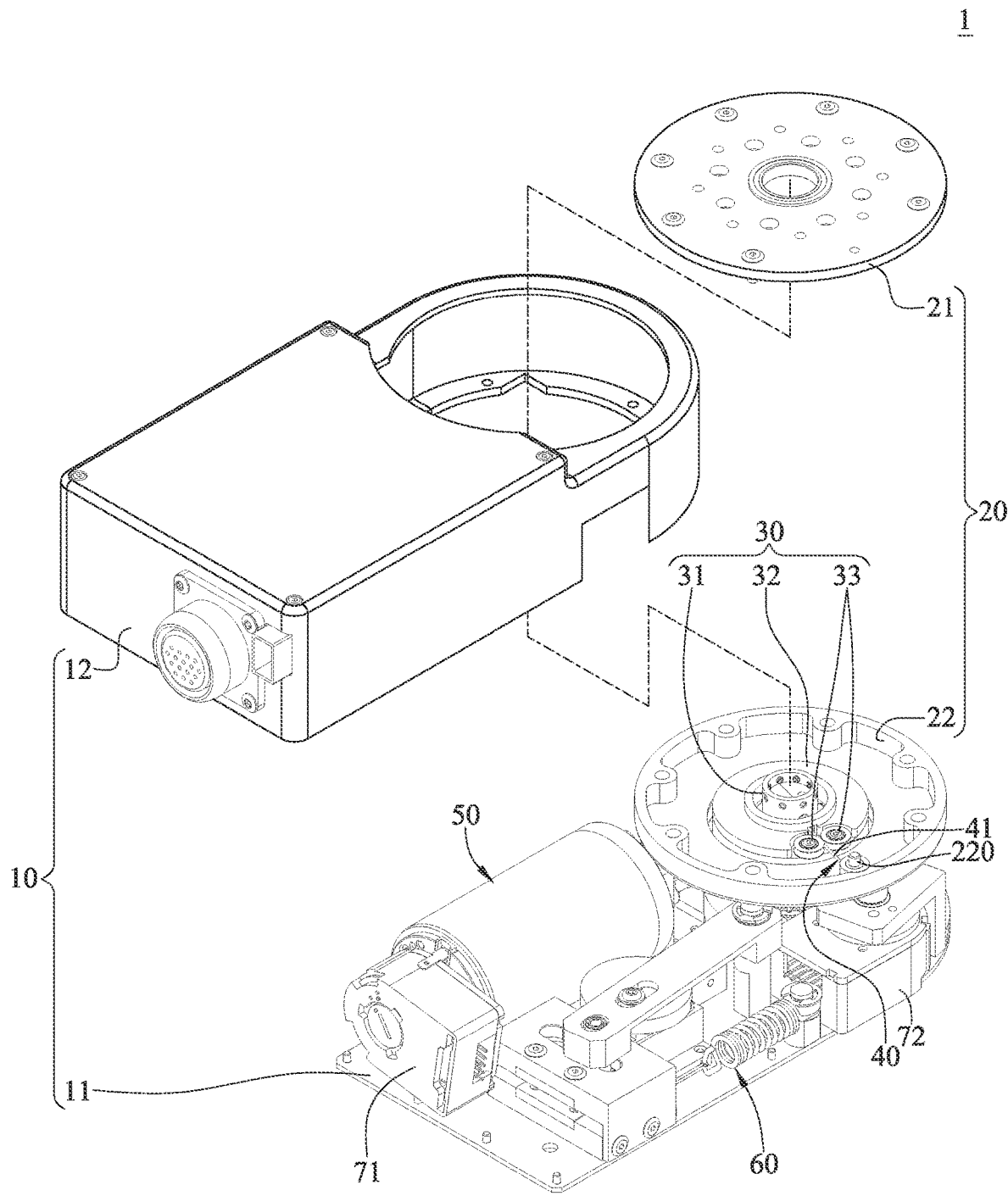
FIG. 2 is an exploded view of the actuator in FIG. 1.

Referring to FIGS. 1 and 2, a perspective view and an exploded view of an actuator 1 according to one embodiment of the disclosure are provided.

In this embodiment, the actuator 1 includes a casing 10, an output disc 20, a transmission component 30, a cable 40, a first power source 50, a tension adjustment assembly 60, a first encoder 71, and a second encoder 72. The actuator 1 is applicable to a robot arm (not shown). In one application, the casing 10 of the actuator 1 may be disposed on one arm member of the robot arm while the output disc 20 is disposed on another arm member of the robot arm, such that the actuator 1 is able to cause the arm members to move relative to each other when rotating the output disc 20 relative to the casing 10.

Figure 3:
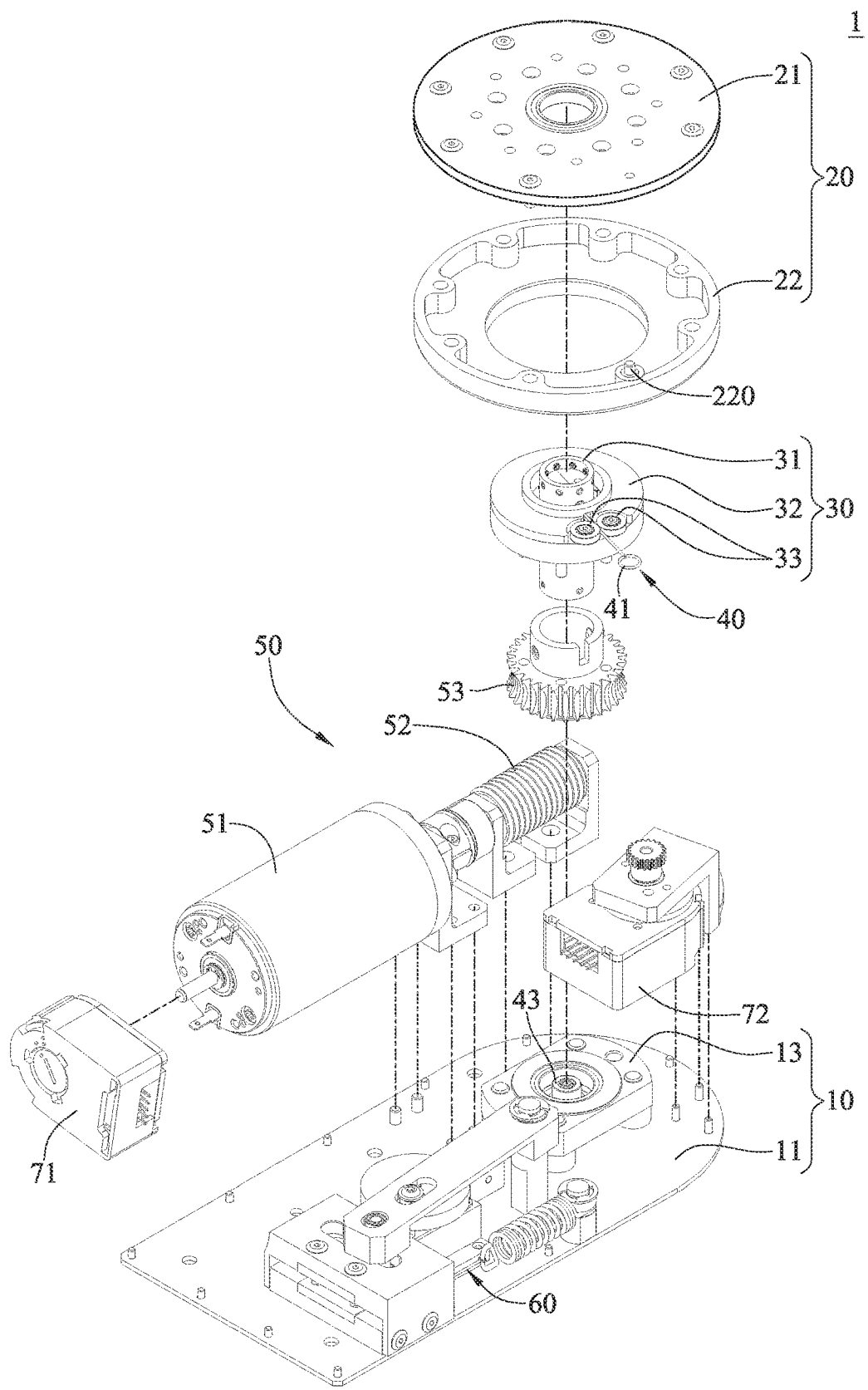
FIGS. 3 to 5 are different partially exploded views of the actuator in FIG. 1.

In more detail, referring to FIG. 2 and further referring to FIG. 3, where FIG. 3 is a partially exploded view of the actuator 1. As shown, the casing 10 includes a base 11, a cover 12, and a stand 13, the cover 12 and the stand 13 are disposed on the base 11, and the stand 13 is located between the cover 12 and the base 11.

The output disc 20 and the transmission component 30 are disposed on and rotatable relative to the stand 13 of the casing 10. Specifically, the output disc 20 includes an upper disc member 21 and a lower disc member 22 fixed to the upper disc member 21, the transmission component 30 includes a shaft 31 rotatably disposed on the stand 13, a ring body 32 fixed to and surrounding the shaft 31, and two rollers 33 disposed on the ring body 32, the upper disc member 21 is rotatably disposed on the shaft 31, and the lower disc member 22 surrounds the ring body 32 of the transmission component 30.

The cable 40 includes a first part 41 being disposed through and clamped by the rollers 33 of the transmission component 30 and connected to the lower disc member 22 of the output disc 20. In addition, the first part 41 has one end sleeved on a protrusion 220 of the lower disc member 22. In other words, the first part 41 of the cable 40 extends outwards from the periphery of the transmission component 30 to connect to the lower disc member 22.

The first power source 50 includes a first motor 51, a worm shaft 52, and a worm wheel 53. The first motor 51 is disposed on the base 11 of the casing 10. The worm shaft 52 is connected to the first motor 51. The worm wheel 53 is fixed to the shaft 31 of the transmission component 30 and rotatably disposed on the stand 13 of the casing 10 via the shaft 31. The worm shaft 52 and the worm wheel 53 are engaged with each other. The first motor 51 is configured to rotate the worm shaft 52 so as to rotate the worm wheel 53 and the transmission component 30 relative to the stand 13 of the casing 10. Note that any known motor that can meet the above requirements may be served as the first motor 51 of the disclosure, such as a DC motor.

The tension adjustment assembly 60 is disposed on the base 11 of the casing 10. The first encoder 71 is disposed on the base 11 of the casing 10 and connected to the first motor 51 of the first power source 50. The first encoder 71 is configured to measure the output of the first motor 51. The second encoder 72 is disposed on the base 11 of the casing 10 and located at a side of the output disc 20. The second encoder 72 is configured to measure the rotation angle of the output disc 20 relative to the casing 10.

Figure 4:
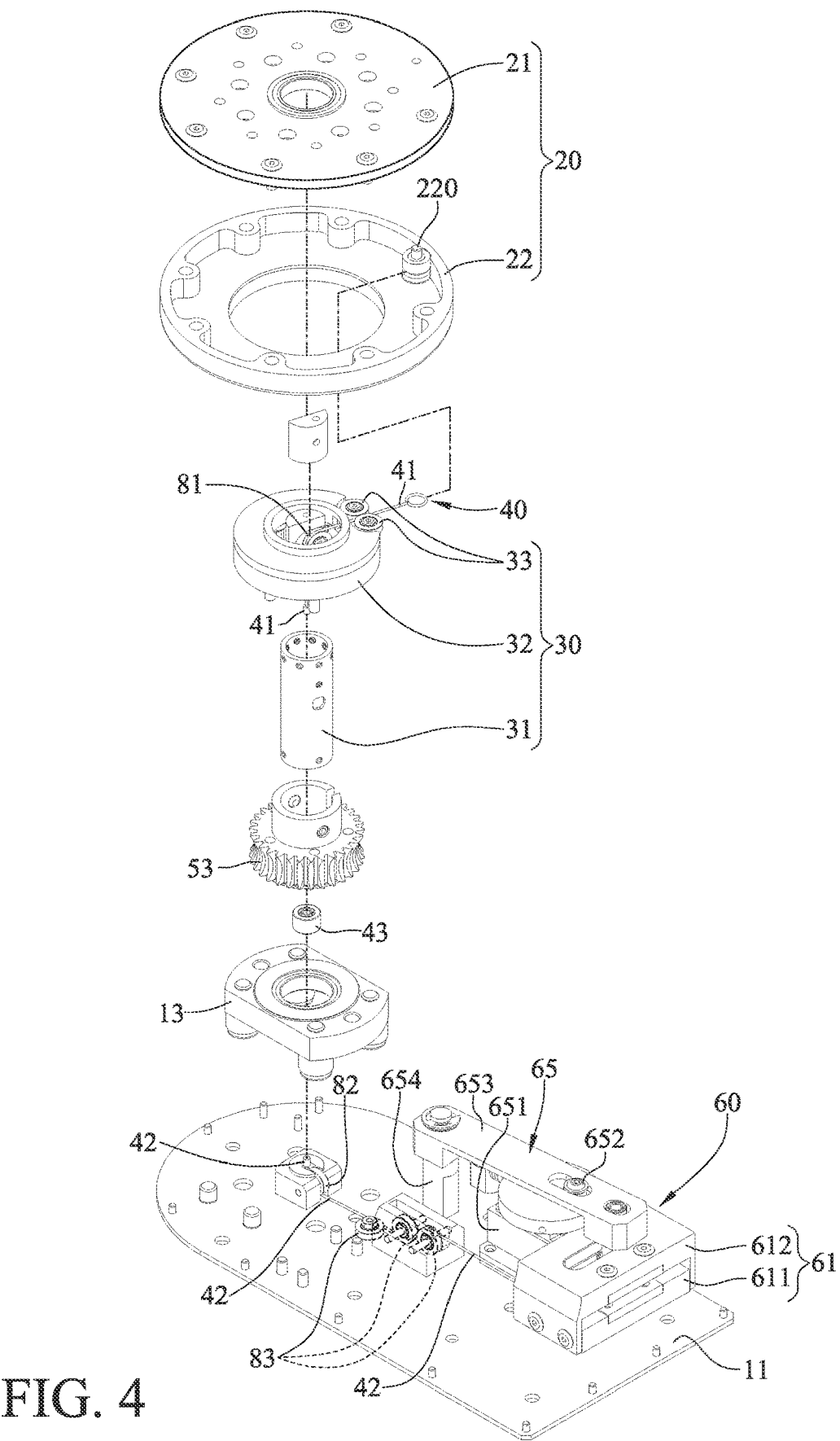

Then, referring to FIG. 3 and further referring to FIG. 4, where FIG. 4 is another partially exploded view of the actuator 1. As shown, the cable 40 further includes a second part 42 and a bearing 43, the first part 41 is connected to and rotatable relative to the second part 42 via the bearing 43.

In this embodiment, the actuator 1 may further include a first roller 81 and a second roller 82. The first roller 81 is disposed in the shaft 31 of the transmission component 30. The first part 41 of the cable 40 is partially located in the shaft 31 and redirected by the first roller 81, and the first part 41 of the cable 40 is disposed through the area between the rollers 33 of the transmission component 30 and sleeved on the protrusion 220 of the lower disc member 22 of the output disc 20. The second roller 82 is disposed on the base 11 of the casing 10. The second roller 82 is located between the base 11 and the stand 13. The bearing 43 of the cable 40 is located between the second roller 82 and the first roller 81 and movable therebetween.

Figure 5:
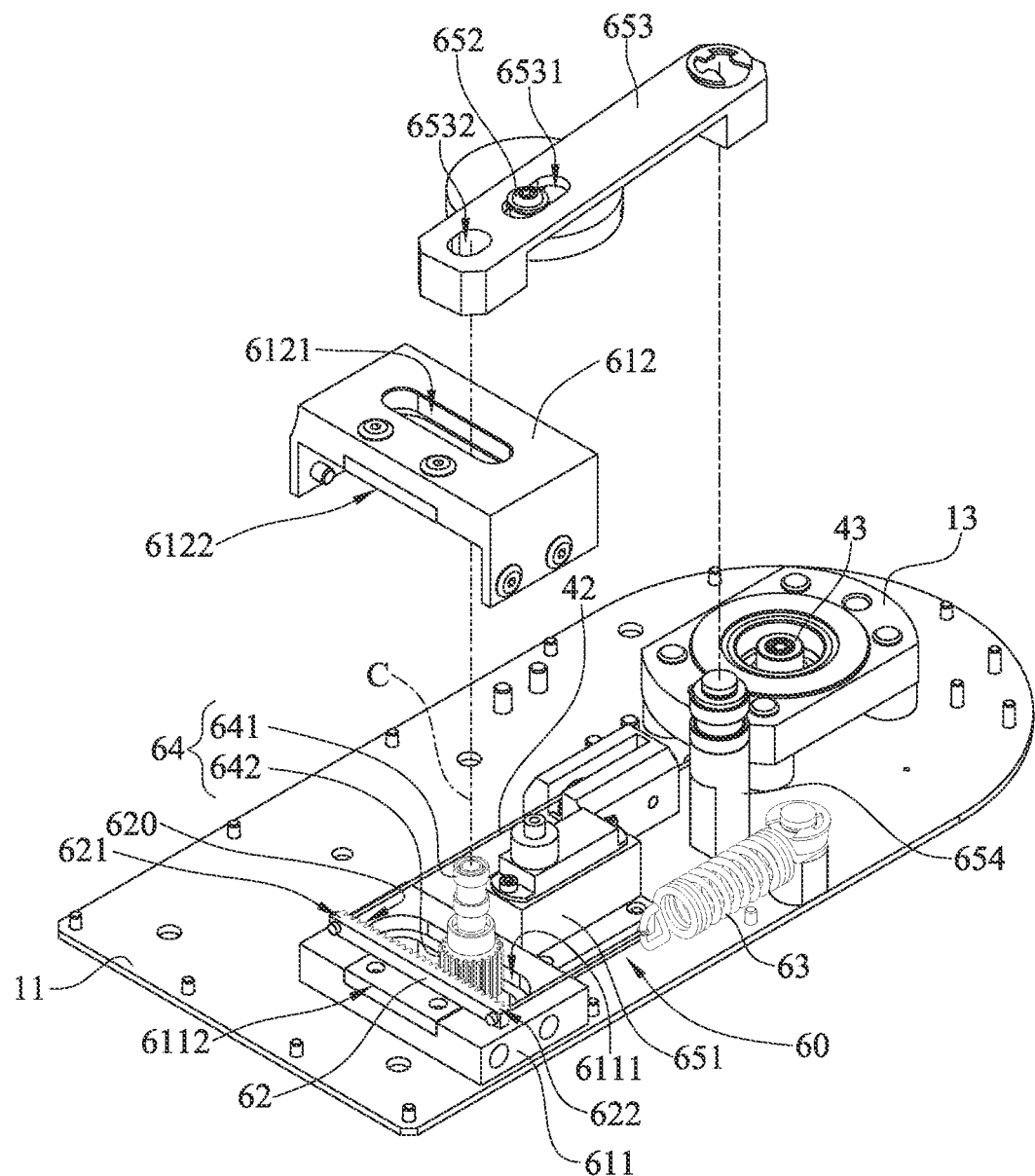

Then, referring to FIG. 4 and further referring to FIG. 5, where FIG. 5 is still another partially exploded view of the actuator 1. As shown, the tension adjustment assembly 60 includes a guide component 61, a lever 62, an elastic component 63, a slidable component 64, and a second power source 65.

The guide component 61 includes a lower guide component 611 and an upper guide component 612. The lower guide component 611 has a lower hole 6111 and a lower clamp portion 6112 located adjacent to the lower hole 6111. The upper guide component 612 has an upper hole 6121 and an upper clamp portion 6122 located adjacent to the upper hole 6121. The lower guide component 611 is located on the base 11 of the casing 10. The lever 62 is placed on the lower clamp portion 6112 of the lower guide component 611. The upper guide component 612 is disposed on the lower guide component 611. The upper clamp portion 6122 of the upper guide component 612 covers the lever 62, such that the lever 62 is located between and clamped by the lower clamp portion 6112 and the upper clamp portion 6122. The lever 62 has a first end 621 and a second end 622 located at two opposite ends thereof.

In this embodiment, the actuator 1 may further include three guide rollers 83. The cable 40 is disposed through the shaft 31 and extends to the second roller 82. The second part 42 of the cable 40 is redirected by the second roller 82 and guided by the guide rollers 83, and one end of the second part 42 of the cable 40 is connected to the first end 621 of the lever 62. The elastic component 63 is connected to the base 11 of the casing 10 and the second end 622 of the lever 62.

Note that the quantity of the guide rollers 83 may be modified as required; in some other embodiments, the actuator may include more or less than three guide rollers, or the actuator may omit the guide roller.

The slidable component 64 includes a pillar part 641 and a gear part 642 rotatably disposed on the pillar part 641. The lever 62 may be in a form of a gear rack having teeth 620. Some teeth 620 are engaged with the gear part 642. The pillar part 641 of the slidable component 64 is slidably disposed on the base 11 of the casing 10 via the guide component 61. Specifically, the pillar part 641 is partially and movably located in the upper hole 6121 of the upper guide component 612, the gear part 642 is located in the lower hole 6111 of the lower guide component 611 and engaged with the teeth 620 of the lever 62 and located between the first end 621 and the second end 622 thereof, the transmission component 30 and the elastic component 63 are located at one side of the slidable component 64, and the lever 62 is located another side of the slidable component 64 opposite to the transmission component 30 and the elastic component 63. With such a configuration, the slidable component 64 is linearly movable along the lever 62 so that the position of an axis C of the pillar part 641 relative to the first end 621 and the second end 622 of the lever 62 is changeable. By changing the position of the axis C of the pillar part 641, the ratio of the moment arm of the cable 40 to that of the elastic component 63 changes, thereby changing the tension of the cable 40. In this embodiment, when the pillar part 641 of the slidable component 64 is linearly moved relative to the lever 62, the gear part 642 of the slidable component 64 is rotated relative to the pillar part 641 by being engaged with the teeth 620, but the disclosure is not limited thereto; in some other embodiment, the pillar part and the gear part may be integrally formed as a single piece, such that the pillar part and the gear part of the slidable component can be rotated together by the teeth of the lever while being linearly moved.

The second power source 65 includes a second motor 651, an eccentric shaft 652, a link 653, and a pillar 654. The second motor 651 is disposed on the base 11 of the casing 10. The eccentric shaft 652 is non-coaxially disposed on the second motor 651. The link 653 is pivotably disposed on the base 11 of the casing 10 via the pillar 654. The link 653 has a first hole 6531 and a second hole 6532. The first hole 6531 is located between the pillar 654 and the second hole 6532. The eccentric shaft 652 is slidably located in the first hole 6531, and the pillar part 641 of the slidable component 64 is slidably located in the second hole 6532. The second motor 651 is configured to drive the eccentric shaft 652 to pivot the link 653 relative to the base 11 of the casing 10 to linearly move the pillar part 641 of the slidable component 64 relative to the lever 62. Note that any known motor that can meet the above requirements may be served as the second motor 651 of the disclosure, such as a servomotor.

Figure 6:
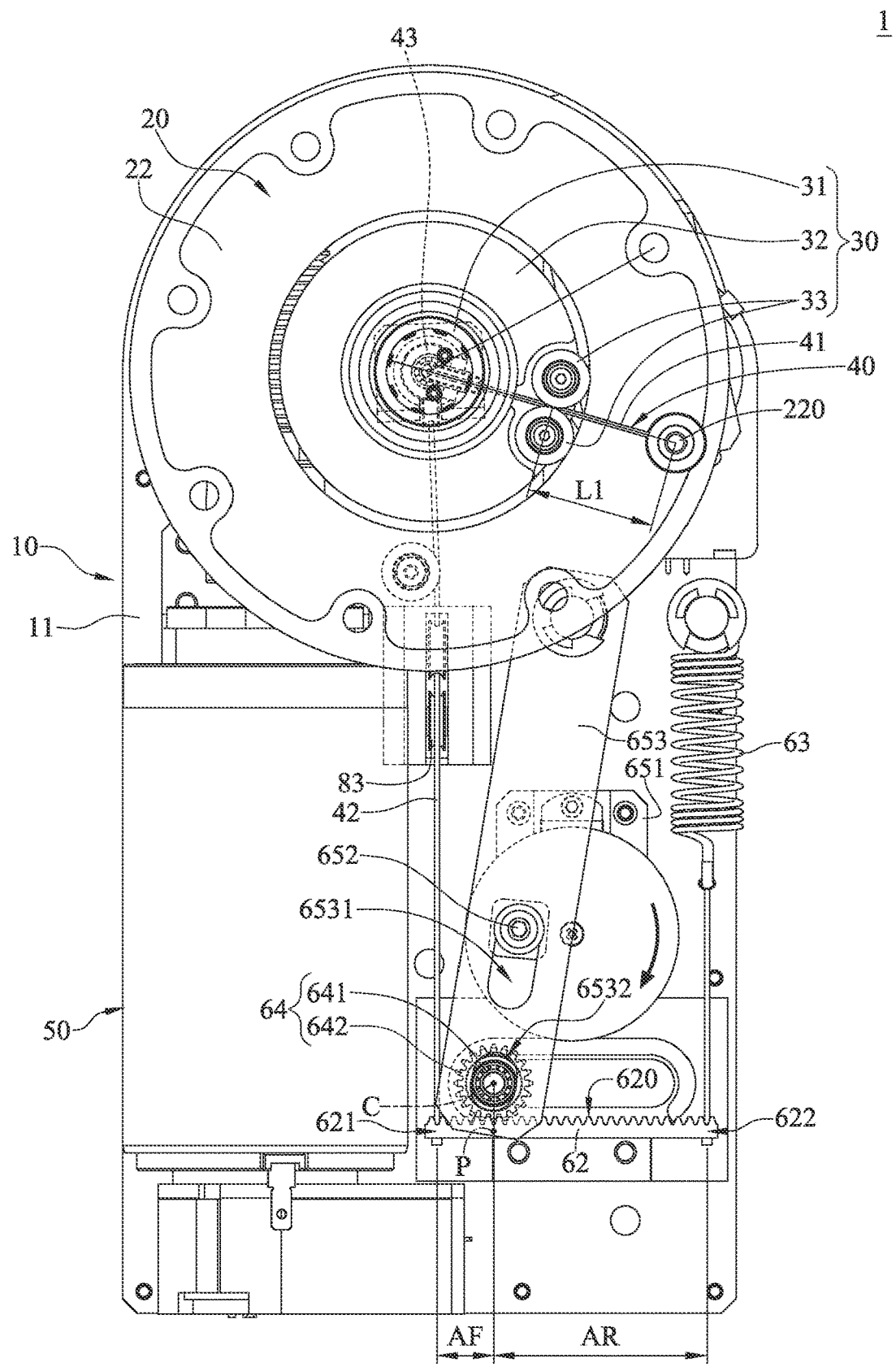
FIGS. 6 to 9 are top views of the actuator in FIG. 1 when a cover is removed.

Referring to FIG. 6, it depicts a top view of the actuator 1 when the cover 12 is removed. As shown, in the configuration involving the tension adjustment assembly 60 (as shown in FIG. 5) and the cable 40, the lever 62 may be served as a lever while a projection P of the axis C of the pillar part 641 of the slidable component 64 on the lever 62 may be served as a fulcrum, such that a part ranging from the projection P to the first end 621 of the lever 62 being pulled by the second part 42 of the cable 40 may be considered as an effort arm AF, and the other part ranging from the projection P to the second end 622 of the lever 62 being pulled by the elastic component 63 may be considered as a resistance arm AR.

As shown in FIG. 6, when the second motor 651 of the second power source 65 drives the eccentric shaft 652 to rotate in a clockwise direction, the link 653 is pivoted in the clockwise direction so as to slide the pillar part 641 of the slidable component 64 towards the first end 621 of the lever 62 relative to the lever 62. The closer the first end 621 of the lever 62 to the slidable component 64, the longer the resistance arm AR and the shorter the effort arm AF are. By doing so, the resistance torque that the elastic component 63 applies on the lever 62 gradually increases, such that the pulling force that the first end 621 acts on the cable 40 increases, causing the tension of the cable 40 to increase. In one exemplary case, when the ratio of the resistance arm AR to the effort arm AF is 3, the tension of the cable 40 will be approximately three times the force that the elastic component 63 acts on the lever 62 in order to achieve the static equilibrium. In other words, when the ratio of the resistance arm AR to the effort arm AF is larger than 1, the tension of the cable 40 will be greater than the force that the elastic component 63 provides.

During the operation of the actuator 1, the first power source 50 drives the transmission component 30 to rotate relative to the casing 10, and the first roller 81 and the first part 41 of the cable 40 are rotated along with the transmission component 30. Since the second part 42 of the cable 40 is connected to the first part 41 via the bearing 43, the first part 41 is freely rotated relative to the second part 42 without any limitation in rotation angle or number of turns, thereby preventing the cable 40 from being twisted by the transmission component 30. Moreover, the transmission component 30 is connected to the lower disc member 22 of the output disc 20 via the first part 41 of the cable 40, such that the tension of the cable 40 rotates the output disc 20 while the transmission component 30 is rotated relative to the casing 10. Furthermore, when the tension adjustment assembly 60 increases the tension of the cable 40, the output disc 20 is prevented from being angularly offset from the transmission component 30; that is, the output disc 20 have a greater stiffness relative to the transmission component 30. Therefore, the actuator 1 can provide a larger torsion to the arm member of the robot arm. As shown in FIG. 6, when there is no external force to unwantedly rotate the output disc 20, the portion of the cable 40 in contact with the rollers 33 of the transmission component 30 and the center of the protrusion 220 of the lower disc member 22 are spaced apart by a length L1.

Figure 7:
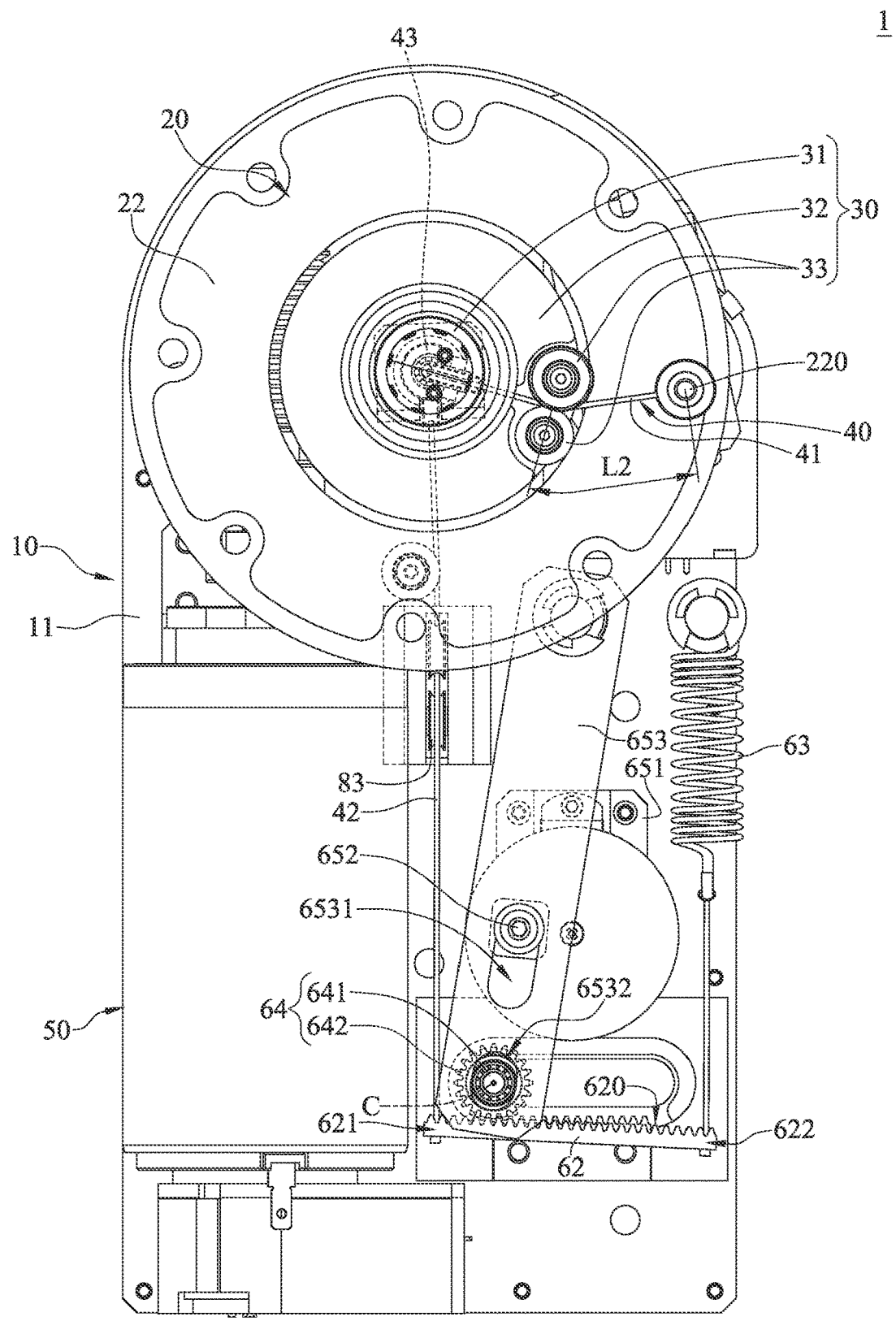

Referring to FIG. 7, FIG. 7 is another top view of the actuator 1 when the output disc 20 is experiencing an external force. As shown, the external force may cause the output disc 20 to angularly offset from the transmission component 30, such that the protrusion 220 pulls the cable 40 to cause the length L1 to increase to a length L2. This pulling of the cable 40 will cause the lever 62 to pivot relative to the slidable component 64 and further extend the elastic component 63.

Figure 8:
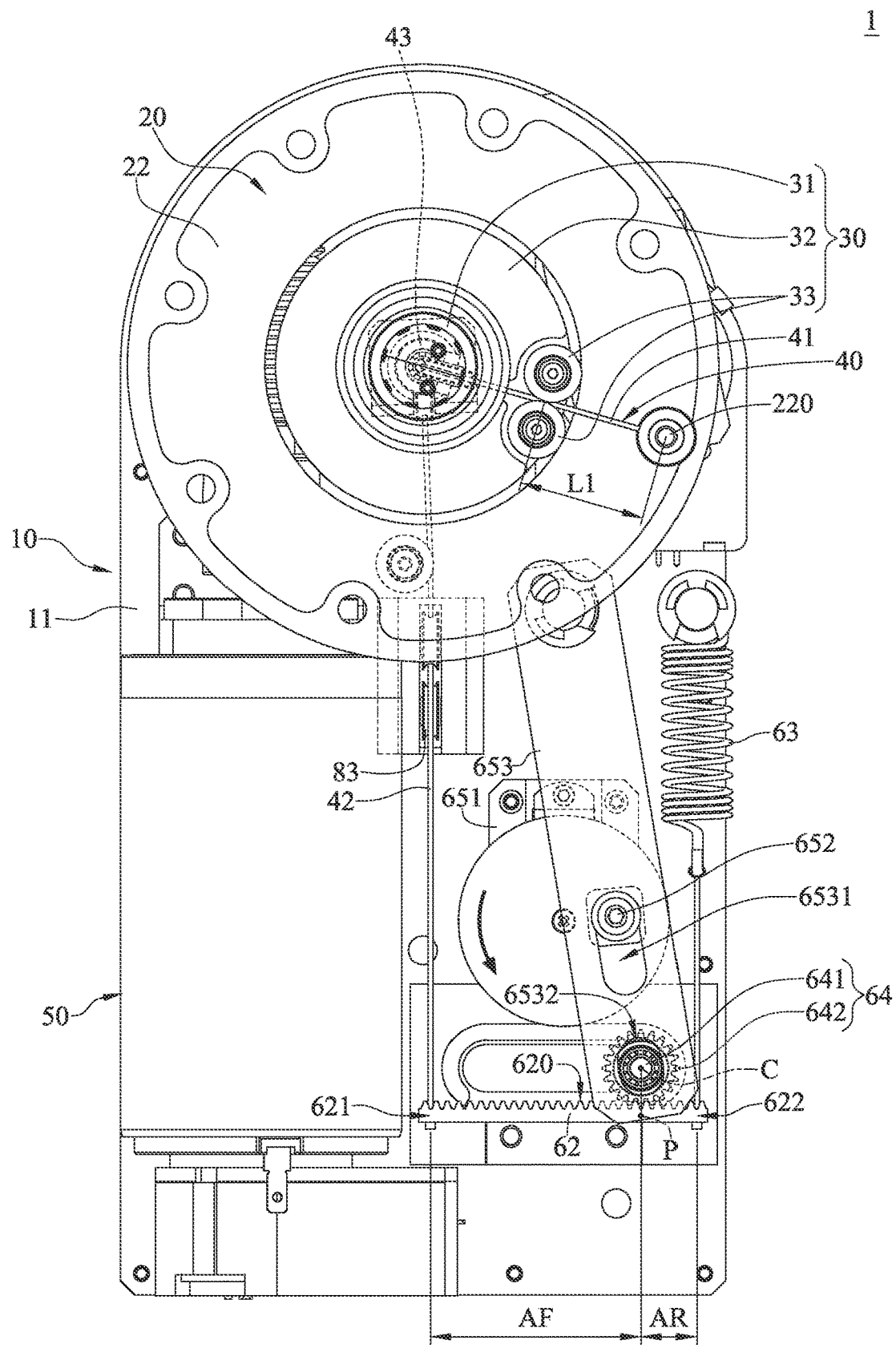

Referring to FIG. 8, it depicts another top view of the actuator 1 when the cover 12 is removed. As shown, when the second motor 651 of the second power source 65 drives the eccentric shaft 652 to rotate in a counter-clockwise direction, the link 653 is pivoted in the counter-clockwise direction so as to slide the pillar part 641 of the slidable component 64 towards the second end 622 of the lever 62 relative to the lever 62. The closer to the second end 622 to the lever 62 the slidable component 64, the shorter the resistance arm AR the longer the effort arm AF are. By doing so, the resistance torque that the elastic component 63 applies on the lever 62 gradually decreases, such that the pulling force that the first end 621 acts on the cable 40 decreases, causing the tension of the cable to decrease. In one exemplary case, when the ratio of the resistance arm AR to the effort arm AF is one-third, the tension of the cable 40 will be one-third of the force that the elastic component 63 acts on the lever 62 in order to achieve the static equilibrium. In other words, when the ratio of the resistance arm AR to the effort arm AF is smaller than 1, the tension of the cable 40 will be smaller than the force that the elastic component 63 provides.

When the actuator 1 is in operation, the first power source 50 drives the transmission component 30 to rotate relative to the casing 10, and the first roller 81 and the first part 41 of the cable 40 are rotated along with the transmission component 30. Moreover, the transmission component 30 is connected to the lower disc member 22 of the output disc 20 via the first part 41 of the cable 40, such that the tension of the cable 40 rotates the output disc 20 while the transmission component 30 is rotated relative to the casing 10. Furthermore, when the tension adjustment assembly 60 decreases the tension of the cable 40, the output disc 20 have a smaller stiffness relative to the and the transmission component 30. Therefore, the actuator 1 can provide a smaller torsion to the arm member of the robot arm. As shown in FIG. 8, when there is no external force to unwantedly rotate the output disc 20, the portion of the cable 40 in contact with the rollers 33 of the transmission component 30 and the center of the protrusion 220 of the lower disc member 22 are spaced apart by the length L1.

Figure 9:
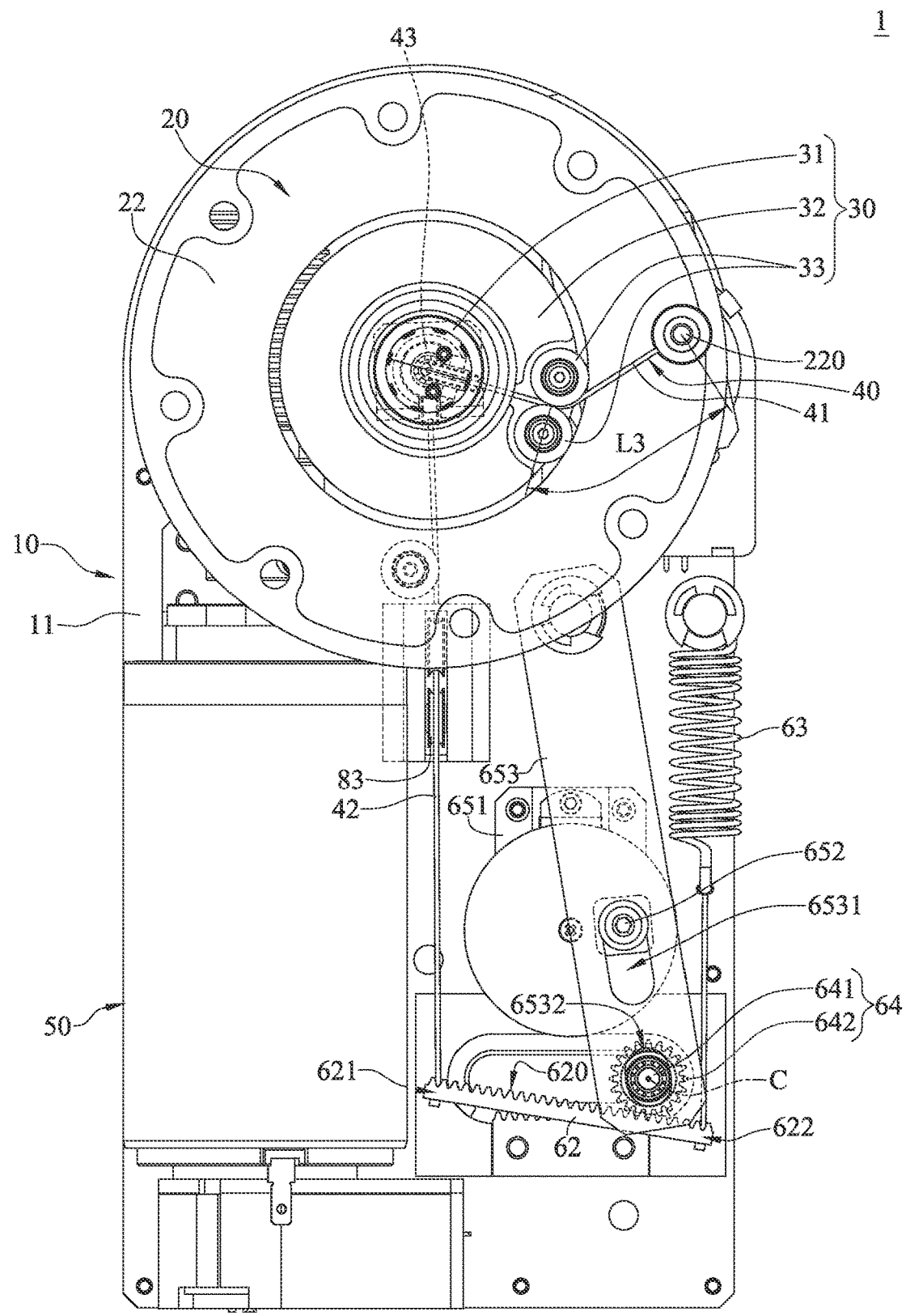

Referring to FIG. 9, FIG. 9 is yet another top view of the actuator 1 in FIG. 1 when the output disc 20 is experiencing an external force. As shown, the external force may cause the output disc 20 to angularly offset from the transmission component 30, such that the protrusion 220 pulls the cable 40 to cause the length L1 to increase to a length L3. This pulling of the cable 40 will cause the lever 62 to pivot relative to the slidable component 64 and extend the elastic component 63. Compared FIG. 9 with FIG. 7, since the stiffness of the output disc 20 relative to the transmission component 30 in the case of FIG. 9 is smaller than that in the case of FIG. 7, when the output disc 20 in each case is experiencing the same external force, the length L3 of the portion of the cable 40 shown in FIG. 9 is greater than the length L2 of the portion of the cable 40 shown in FIG. 7.

According to the actuator as discussed in the above embodiment, the tension of the cable can be adjusted by adjusting the ratio of the effort arm of the cable to the resistance arm of the elastic component, such that the stiffness of the output disc relative to the transmission component is able to be adjusted to respond to various operating conditions.

Moreover, since the second part of the cable is connected to the first part of the cable via the bearing, the first part can be freely rotated relative to the second part without any limitation in the rotation angle or number of turns, thereby preventing the cable from being twisted by the transmission component. Therefore, the output disc can be rotated continuously relative to the casing, have an adjustable stiffness relative to the transmission component, and have a controllable balance position.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An actuator, comprising:
a casing;
an output disc, rotatably disposed on the casing;
a transmission component, rotatably disposed on the casing;
a cable, disposed through the transmission component and having an end connected to the output disc;
a first power source, disposed on the casing and connected to the transmission component, wherein the first power source is configured to drive the transmission component to rotate relative to the casing; and
a tension adjustment assembly, comprising:
a lever, having a first end and a second end opposite to each other, wherein the first end is connected to another end of the cable;
an elastic component, connected to the casing and the second end of the lever; and
a slidable component, slidably disposed on the casing and in contact with a portion of the lever located between the first end and the second end of the lever, wherein the slidable component is slidable along the lever to change a position thereof relative to the first end and the second end so as to adjust a tension of the cable.

2. The actuator according to claim 1, wherein the tension adjustment assembly further comprises a second power source, the second power source is disposed on the casing and connected to the slidable component, and the second power source is configured to drive the slidable component to linearly slide relative to the lever.

3. The actuator according to claim 2, wherein the second power source comprises a motor, an eccentric shaft, a link, and a pillar, the link has a first hole and a second hole, the link is pivotably disposed on the casing via the pillar, the first hole is located between the pillar and the second hole, the eccentric shaft is slidably disposed in the first hole, the slidable component is slidably disposed in the second hole, the motor is disposed on the casing and connected to the eccentric shaft, and the motor is configured to drive the eccentric shaft to pivot the link relative to the casing to linearly slide the slidable component relative to the lever.

4. The actuator according to claim 1, wherein the lever has teeth, the slidable component comprises a pillar part and a gear part, the gear part is rotatably disposed on the pillar part, and a part of the teeth are engaged with the gear part.

5. The actuator according to claim 1, wherein the cable comprises a first part, a second part, and a bearing, the first part is connected to the second part via the bearing, the first part is rotatable relative to the second part, the first part is disposed through the transmission component and connected to the output disc from a periphery of the transmission component, and the second part is connected to the first end of the lever.

6. The actuator according to claim 1, wherein the transmission component comprises two rollers, and the cable is disposed through an area between the rollers and connected to the output disc.

7. The actuator according to claim 6, further comprising a first roller, wherein the transmission component comprises a shaft and a ring body, the ring body surrounds the shaft, the rollers are disposed on the ring body, the shaft is rotatably disposed on the casing, the output disc is rotatably disposed on the shaft, the first roller is disposed in the shaft, the cable is partially located in the shaft and redirected by the first roller, and the cable is disposed through the shaft and the area between the rollers and connected to the output disc.

8. The actuator according to claim 7, further comprising a second roller, wherein the casing comprises a base and an stand, the stand is disposed on the base, the first power source, the tension adjustment assembly, and the second roller are disposed on the base, the second roller is located between the base and the stand, the shaft is rotatably disposed on the stand, the cable is disposed through the shaft and redirected by the second roller, and the cable is connected to the first end of the lever.

9. The actuator according to claim 1, wherein the first power source comprises a motor, a worm shaft, and a worm wheel, the motor is disposed on the casing, the worm shaft is connected to the motor, the worm wheel is rotatably disposed on the casing, the transmission component is fixed to the worm wheel, the worm shaft and the worm wheel are engaged with each other, and the motor is configured to rotate the worm shaft so as to rotate the worm wheel and the transmission component relative to the casing.

10. The actuator according to claim 1, further comprising a first encoder and a second encoder, wherein the first encoder is disposed on the casing for measuring an output of the first power source, and the second encoder is disposed on the casing for measuring a rotation angle of the output disc relative to the casing.

* * * * *